US009874626B2

(12) United States Patent
Jain et al.

(10) Patent No.: US 9,874,626 B2
(45) Date of Patent: Jan. 23, 2018

(54) MULTICODE TRANSMITTER

(71) Applicant: THE BOEING COMPANY, Chicago, IL (US)

(72) Inventors: Atul Jain, Chicago, IL (US); David A. Whelan, Chicago, IL (US)

(73) Assignee: The Boeing Company, Chicago, IL (US)

( * ) Notice: Subject to any disclaimer, the term of this patent is extended or adjusted under 35 U.S.C. 154(b) by 334 days.

(21) Appl. No.: 14/571,085

(22) Filed: Dec. 15, 2014

(65) Prior Publication Data

US 2016/0170009 A1 Jun. 16, 2016

(51) Int. Cl.
*G01S 7/28* (2006.01)
*G01S 7/02* (2006.01)
*G01S 7/282* (2006.01)
*G01S 7/36* (2006.01)
*G01S 13/26* (2006.01)
*G01S 13/28* (2006.01)
*G01S 13/32* (2006.01)
*G01S 7/35* (2006.01)

(52) U.S. Cl.
CPC .............. *G01S 7/023* (2013.01); *G01S 7/282* (2013.01); *G01S 7/36* (2013.01); *G01S 13/26* (2013.01); *G01S 13/284* (2013.01); *G01S 13/325* (2013.01); *G01S 7/35* (2013.01)

(58) Field of Classification Search
CPC ................................. G01S 7/023; G01S 7/282
USPC .................................................. 342/175, 189
See application file for complete search history.

(56) References Cited

U.S. PATENT DOCUMENTS

| 4,153,900 A | 5/1979 | Novak et al. |
| 8,509,205 B2 | 8/2013 | Jain et al. |
| 2002/0150065 A1* | 10/2002 | Ponnekanti .......... H04B 7/0617 370/334 |
| 2003/0036359 A1* | 2/2003 | Dent ...................... H04B 7/005 455/63.1 |
| 2003/0086479 A1* | 5/2003 | Naguib .............. H04B 1/71072 375/144 |
| 2003/0185309 A1 | 10/2003 | Pautler et al. |

(Continued)

OTHER PUBLICATIONS

GB Search Report, Application No. GB1520925.7, dated Feb. 23, 2016.

*Primary Examiner* — Marcus E Windrich
(74) *Attorney, Agent, or Firm* — Haynes and Boone, LLP (57) ABSTRACT

Systems, methods, and apparatus for transmitting and receiving signals are disclosed. In one or more embodiments, the disclosed method involves splitting a signal into low power portions. The method further involves coding the low power portions to produce coded low power portions, where the coding comprises convolving each low power portion with a respective different code. Also, the method involves summing the coded low power portions to produce a resultant coded signal. In addition, the method involves transmitting the resultant coded signal towards a target object. Additionally, the method involves receiving a reflected resultant coded signal, where the resultant coded signal reflects off the target object to produce the reflected resultant coded signal. Also, the method involves decoding the reflected resultant coded signal to produce a decoded signal. Further, the method involves correlating the decoded signal to produce a complete received signal.

20 Claims, 5 Drawing Sheets

(56) References Cited

U.S. PATENT DOCUMENTS

2006/0270360 A1* 11/2006 Han ..................... H04B 7/0626
455/69
2008/0285667 A1* 11/2008 Mondal ................ H04B 7/0417
375/260
2009/0303126 A1* 12/2009 Jain ....................... G01S 13/003
342/368

* cited by examiner

MULTICODE TRANSMITTER

CROSS-REFERENCE TO RELATED APPLICATION

This application is related to U.S. Pat. No. 8,509,205 B2, issued on Aug. 13, 2013, the entire disclosure of which is expressly incorporated by reference herein.

FIELD

The present disclosure relates to transmitters. In particular, it relates to multicode transmitters.

BACKGROUND

Currently, in conventional radar and communication systems, signals can often be detected and exploited by spoofers, who can intercept the communications and avoid or jam the signals. However, signals with low detectable transmit power are not as easily detected by spoofers. As such, there is a need for a solution that reduces the detectable transmit power of signals, without impacting the performance of the receiver.

SUMMARY

The present disclosure relates to a method, system, and apparatus for a multicode transmitter. In one or more embodiments, a method for transmitting and receiving signals involves splitting, with a splitter, a signal into at least two low power portions. The method further involves coding, with at least two coders, at least two low power portions of the signal to produce at least two coded low power portions of the signal, where the coding comprises convolving each low power portion of the signal with a respective different code. Also, the method involves summing, with a summer, at least two coded low power portions of the signal to produce a resultant coded signal. In addition, the method involves transmitting, with a transmitter antenna element, the resultant coded signal towards a target object. Additionally, the method involves receiving, with a receiver antenna element, a reflected resultant coded signal, where the resultant coded signal reflects off the target object to produce the reflected resultant coded signal. Also, the method involves decoding, with at least two decoders, the reflected resultant coded signal to produce a decoded signal. Further, the method involves correlating, with a correlator, the decoded signal to produce a complete received signal.

In one or more embodiments, the complete received signal has a power density N times higher when utilizing the correlator, than when not using the correlator, where N is equal to the number of low power portions.

In at least one embodiment, the receiver antenna element is associated with at least two receiver elements, where each of the receiver elements receives all of the reflected resultant coded signal.

In one or more embodiments, the transmitter antenna element and the receiver antenna element are a same antenna element or are different antenna elements.

In at least one embodiment, the splitter is a feed network.

In one or more embodiments, the different codes are orthogonal waveforms. In some embodiments, the orthogonal waveforms are Gold Code waveforms, code division multiple access (CDMA) waveforms, and/or frequency division multiple access (FDMA) waveforms.

In at least one embodiment, the transmitter antenna element is a radio frequency (RF) antenna, an ultrasound aperture, an optical aperture, or an infrared aperture. In some embodiments, the receiver antenna element is a radio frequency (RF) antenna, an ultrasound aperture, an optical aperture, or an infrared aperture.

In one or more embodiments, the transmitter antenna element and the receiver antenna element are in a communications system or a radar system. In some embodiments, the receiver antenna element, in the communications system, is located externally with an external receiver.

In at least one embodiment, the decoding comprises convolving the reflected resultant coded signal with a complex conjugate of a sum of the different codes.

In one or more embodiments, a system for transmitting and receiving signals involves a splitter to split a signal into at least two low power portions. The system further involves at least two coders to code at least two low power portions of the signal to produce at least two coded low power portions of the signal, where the coding comprises convolving each low power portion of the signal with a respective different code. Also, the system involves a summer to sum at least two coded low power portions of the signal to produce a resultant coded signal. In addition, the system involves a transmitter antenna element to transmit the resultant coded signal towards a target object. Additionally, the system involves a receiver antenna element to receive a reflected resultant coded signal, where the resultant coded signal reflects off the target object to produce the reflected resultant coded signal. Also, the system involves at least two decoders to decode the reflected resultant coded signal to produce a decoded signal. Further, the system involves a correlator to correlate the decoded signal to produce a complete received signal.

In at least one embodiment, an apparatus for transmitting and receiving signals involves a splitter to split a signal into at least two low power portions. The apparatus further involves at least two coders to code at least two low power portions of the signal to produce at least two coded low power portions of the signal, where the coding comprises convolving each low power portion of the signal with a respective different code. Also, the apparatus involves a summer to sum at least two coded low power portions of the signal to produce a resultant coded signal. In addition, the apparatus involves a transmitter antenna element to transmit the resultant coded signal towards a target object. Additionally, the apparatus involves a receiver antenna element to receive a reflected resultant coded signal, where the resultant coded signal reflects off the target object to produce the reflected resultant coded signal. Also, the apparatus involves at least two decoders to decode the reflected resultant coded signal to produce a decoded signal. Further, the apparatus involves a correlator to correlate the decoded signal to produce a complete received signal.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for a multicode transmitter. The disclosed system reduces the detectable transmit power with a single element transmitter, without impacting the performance of the sensor (i.e. the receiver). A single transmitter transmits multiple coded waveforms simultaneously. The waveforms are mutually orthogonal to each other. Upon receiving the waveforms, the received signal is cross-correlated with the sum of the complex conjugates of the transmitted waveform signals. The transmitter/receiver suffers no degradation in performance, but a non-cued receiver (i.e. a non-correlated receiver) will receive 1/N times lower energy than the host receiver (i.e. a correlated receiver), where N is equal to the number of waveforms.

According to one or more embodiments of the present disclosure, a multicode transmitter/receiver system is provided that reduces the detected power as seen by an unknown receiver or felt by an object when an antenna is transmitting, while at the same time, maintaining the power relationships of the overall system. In one or more embodiments, the coded transmitter/receiver system transmits a signal that is convolved with orthogonal output waveforms (e.g., Gold Code waveforms, code division multiple access (CDMA) waveforms, and frequency division multiple access (FDMA) waveforms) through an antenna and that cannot be easily detected by an uncorrelated or unmatched receiver because the uncorrelated receiver sees a very low energy output from the antenna. That is, detected power is reduced as seen by the unmatched receiver or felt by an object (animal, human or inanimate). The antenna element is low gain with a wide angular beamwidth, and the propagation loss for any appreciable distance is significant. A matched or correlated receiver, however, may easily detect returns from its own transmission system because the correlated receiver may coherently combine the received individual signals. The correlated receiver sees high energy as coming from the high gain transmit antenna having a narrow angular transmission pattern. Radio Frequency Interference (RFI) of the transmitted waveform may be reduced based on the number of orthogonal waveforms used. According to one or more embodiments, the system described herein may assist with power management for several applications including communications systems, radar systems, ultrasound systems, optical systems, infrared systems or other microwave systems.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with, and that the system described herein is merely one example embodiment of the present disclosure.

For the sake of brevity, conventional techniques and components related to multicode transmitters, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
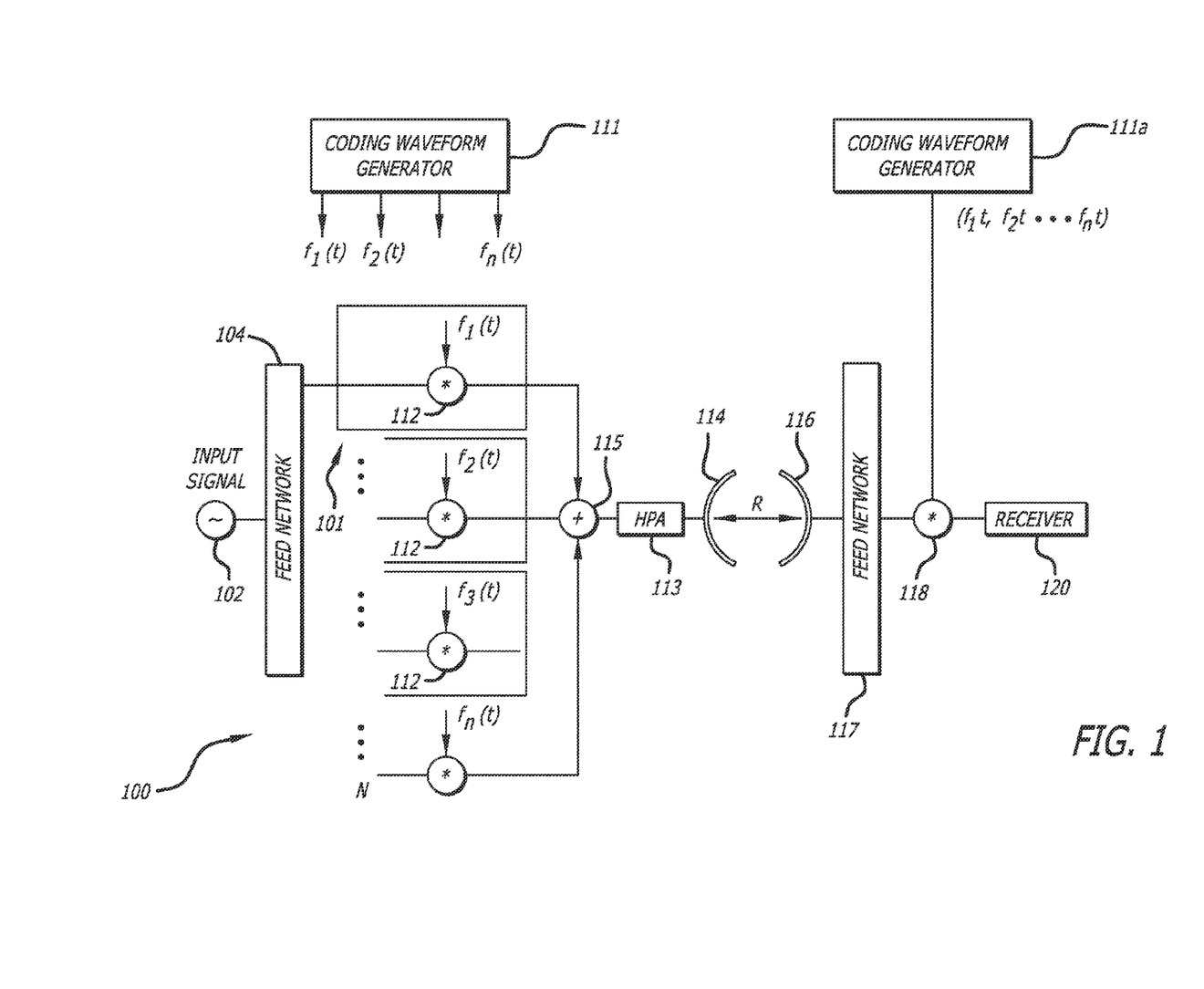
FIG. 1 shows a diagram illustrating a multicode aperture transmitter/receiver for a communications system, in accordance with an embodiment.

Referring to FIG. 1, a diagram is shown illustrating a multicode aperture transmitter/receiver for a communications system in accordance with an embodiment. In FIG. 1, in a transmitter system 100, a signal 102 is split into low power signals (i.e. sub-signals) through a feed network 104 (i.e. the feed network 104 operates as a splitter). The split signal (i.e. the sub-signals) is then transmitted in the form of multiple coded waveforms (i.e. coded sub-signals) that are orthogonal to each other through an N number of RF modules 101 of the antenna transmitter system 100. One of the RF modules 101 may receive a portion of signal 102 (low power signal) (i.e. a single sub-signal) via feed network 104, from where the portion of signal 102 (i.e. the sub-signal) may then be directed to the antenna element 114 via a correlator 112 that codes the portion of signal 102 (i.e. to generate a coded sub-signal) by convolution with a coding waveform $f_n(t)$. The individual coding waveforms $f_1(t)$, $f_2(t), \ldots, f_n(t)$ may be supplied by a waveform generator 111 to the respective RF module 101, or alternatively, the coding waveforms may be built-in within RF modules 101. General techniques for generating random codes are well known in the art as set forth in the technical literature. See for example "Modern Radar" by Raymond S. Berkowitz (John Wiley & Sons, Inc. NY 1965), at chapter 4.

It will be appreciated that a number of embodiments may exist to split signal 102 (i.e. into sub-signals) and feed it to the antenna element 114 of the transmitter system 100 and are well documented. In this embodiment, feed network 104 is a corporate feed system. Thus, signal 102 may be split into low power signals or portions, and each portion of split signal 102 may be individually coded. Each coded portion of signal 102 may then be summed by a summer 115. The output of the summer 115 is directed through a high power amplifier (HPA) 113 to be transmitted through the antenna element 114 of the transmitter system 100 for a practical distance "R" such that a correlated receiver element 116 is programmed to detect and decode all of the transmitted N coded portions of signal 102. The radiation from all the transmitted coded portions of signal 102 is received at the receiver element 116, where it is coherently integrated and processed. The receiver element 116 is a single element. The coded radiation of each coded portion of signal 102 that is received at the correlated receiver element 116 may be combined through a receive feed network 117. The combined signal may then be decoded at correlator 118 for each of the coded waveforms by convolution with the sum of the complex conjugate of the coding waveforms used at the transmitter element 114. Correlator 118 may be integrated into receiver 120 or it may be separate from receiver 120, and it may be either placed before receiver 120 or after receiver element 116 and before feed network 117. The decoded signals may then be added to give the final received signal. The coding waveforms may be supplied by a corresponding waveform generator 111a at the receiver side or they may be stored in memory at receiver 120. Consequently, this system operates as a normal communications system and sees the transmitter as a high power, high gain transmitter.

In the case where receiver 120 is an unmatched or uncorrelated receiver, receiver 120 may detect the transmitted coded signals (i.e. the coded sub-signals) from the antenna element 114, however, the uncorrelated receiver 120 will not be able to match filter or decode all the coded signals and coherently add them simultaneously because it lacks knowledge of all the codes that were used in generating the transmitted signal. Instead, the uncorrelated receiver 120 observes the coded split signal 102 as being very low power signals and will only be able to detect the incoherent sum of the radiated energy from the antenna element 114, which is very low at any practical distance R because of the broad angular beamwidth of the radiation pattern from the antenna element 114. Uncorrelated receiver 120, therefore, detects radiation from the antenna element 114 as low power because the uncorrelated receiver 120 sees the antenna as a transmitter with the beam pattern of its element 114, that is, the pattern of the energy is the far field pattern of the individual element.

In FIG. 1, for antenna element 114 radiating power "$P_e$", where $G_e$ is the gain of the antenna element 114, the power density "$P_D$" at a distance "R" for a proportionality constant $K_c$ that accounts for the transmission medium is: $P_D = K_c P_e G_e / 4\pi R^2$.

If a correlated receiver element 116 is provided at distance "R", it will be able to decode all the waveforms from the antenna element 114 and will combine them coherently. In this case, the power density "$P_D$" of the correlated receiver element 116 at distance "R" is the same as if all the transmitted coded waveforms were the same or if no coding was applied at element 114 of the transmitter: $P_D = K_c N P_e G_e / 4\pi R^2$.

That is, the power density will be "N" times higher for a correlated receiver or a transmitter with the same waveforms for the element than for an uncorrelated receiver and a transmitter with orthogonal coded waveforms for the transmitting element. Consequently, RFI or radiation hazard is reduced by a factor of N for a multicode aperture transmitter/receiver, while equivalent performance is maintained.

Figure 2A:
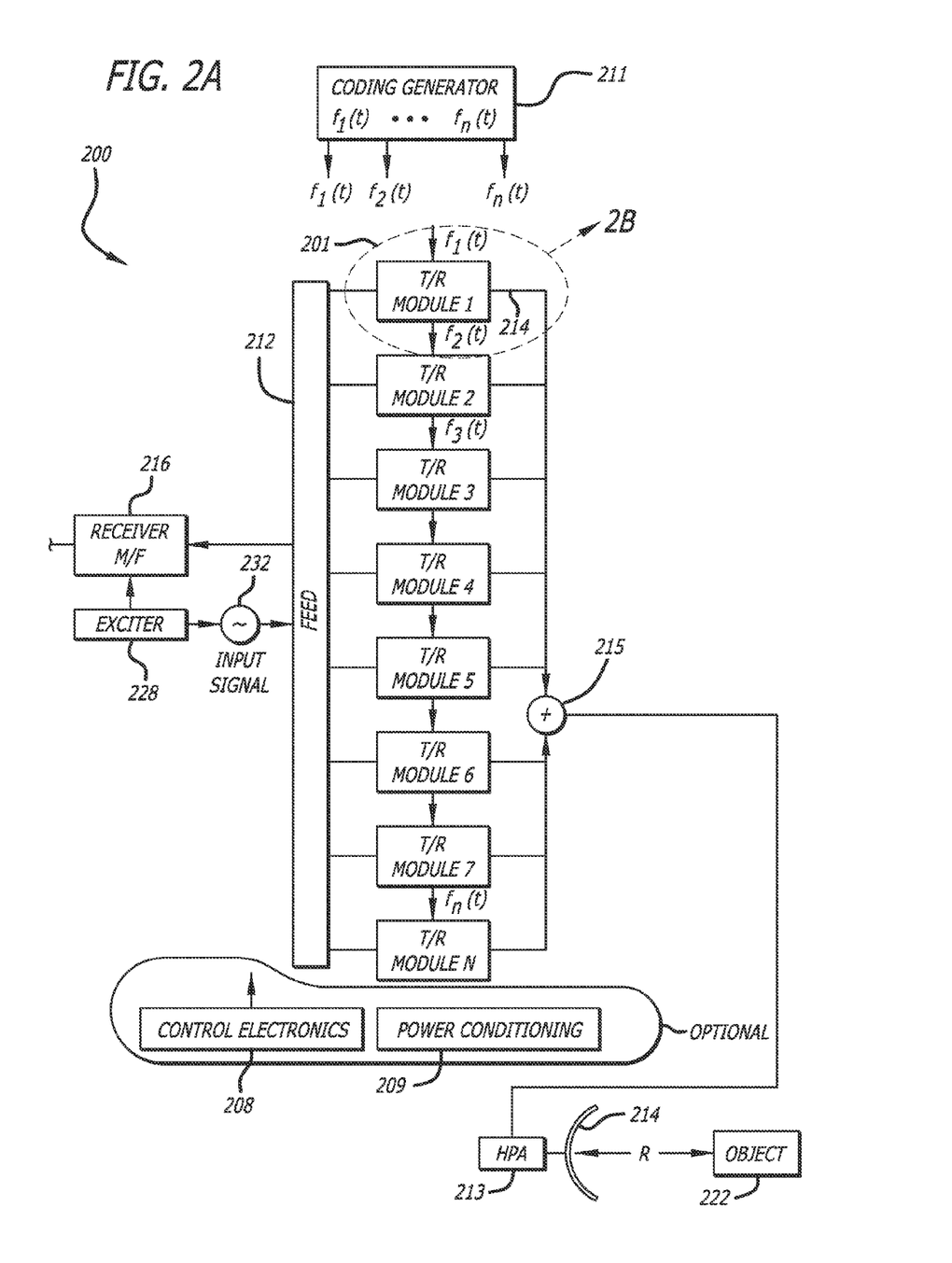
FIG. 2a shows a diagram illustrating a multicode aperture transmitter/receiver for a radar system, in accordance with an embodiment.
Figure 2B:
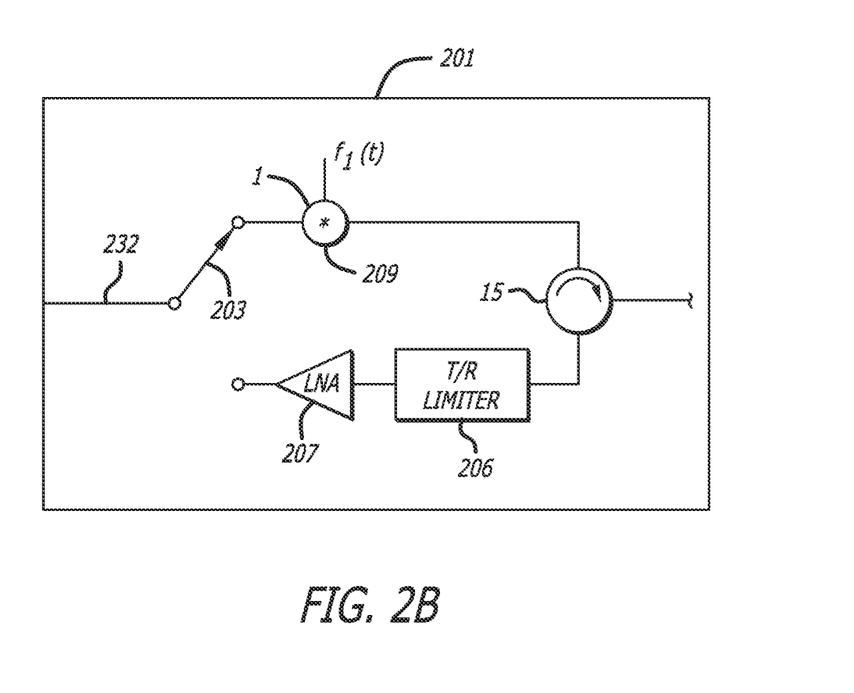
FIG. 2b shows an exploded view of a T/R RF module 201 of FIG. 2a, according to an embodiment.

Referring now to FIG. 2a, a diagram is provided illustrating a multicode aperture transmitter/receiver for a radar system in accordance with an embodiment. Referring also to FIG. 2b, an exploded view of a T/R RF module 201 of FIG. 2a is illustrated according to an embodiment. In FIG. 2a, the multicode aperture transmitter/receiver may act as a transmitter for which it may also act as a receiver in the case of a radar system 200. A signal 232 from an exciter 228 is split into low power signals (i.e. sub-signals), which are supplied to "N" transmitter/receiver (T/R) RF modules 201 through a feed 212. Referring to FIG. 2b, each portion of the split signal 232 will produce a desired radiation beam to illuminate a target object 222 at a distance "R". For illustration purposes, transmitter/receiver (T/R) switch 203 is shown in the transmit mode of operation. Each portion of signal 232 (i.e. each sub-signal) may be convolved with a coding waveform $f_n(t)$ at a correlator 209 (to produce a coded sub-signal) for transmission to an antenna element 214. Each of the coding waveforms for the different sub-signals may be orthogonal to each other. The coding waveforms may be supplied by a signal generator 211 or may be stored at the respective RF modules 201. General techniques for generating random codes are well known in the art as set forth in the technical literature. During the transmit mode of the radar system 200, T/R switch 203 is connected thereto so that the split signal 232 is routed through a circulator 205 to a summer 215. The output of the summer 215 is directed through a high power amplifier (HPA) 213 to be transmitted through the antenna element 214.

During the receive mode of radar system 200, radar system 200 return signals are routed back through circulator 205, a receiver protector or T/R limiter 206 and a low noise amplifier 207. The return signal is then routed to feed 212 and then combined after being decoded with the matched filters for each of the coded waveforms at matched filter receiver 216. The decoding may be done in receiver 216 by convolution of the combined received signal with the complex conjugate of the sum of the coding waveforms, $[f_1(t)^* + f_2(t)^* + \ldots + f_n(t)^*]$, which are used to code the individual split portions of signal 232 at the transmitter element 214. Here, the * sign denotes the complex conjugate, i.e., f(t)* is the complex conjugate of f(t).

In one or more embodiments, control electronics 208 or power conditioning block 209 may be provided. Control electronics 208 may serve to interface RF module 201 to the antenna controller, providing beam steering and timing information needed by RF module 201. Power-conditioning block 209 may provide the necessary sequential biases and switching commands for the respective RF module 201 components.

For a pulsed radar, during transmit, the receive side low noise amplifier 207 output is turned off and during receive, the transmit amplifier input is turned off by T/R switch 203. The radar system dead time may be utilized for changing the phase and attenuator values and for switching channel select T/R switch 203. Other types of radars may include a Continuous Wave (CW) radar with independent Transmitter-Receivers, or an FM-CW radar that may receive while transmitting and that is not pulsed but may use the same coding technique to manage detected power.

Figure 2C:
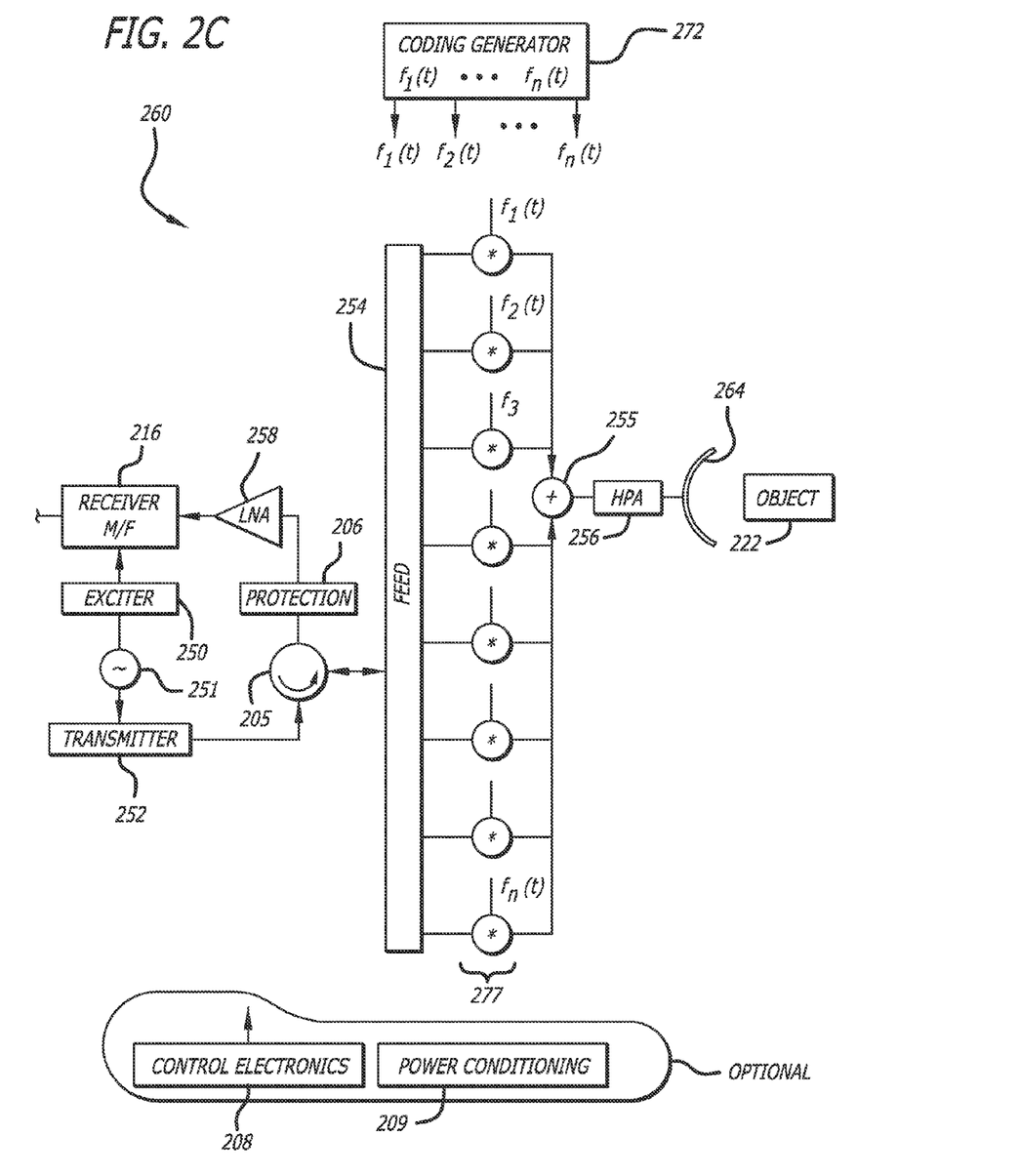
FIG. 2c shows a diagram illustrating a multicode aperture transmitter/receiver for a radar system, in accordance with another embodiment.

Referring to FIG. 2c, a diagram illustrating a multicode aperture transmitter/receiver for a radar system is shown in accordance with another embodiment. In this embodiment, transmitter 252 provides the amplification of an input signal 251 from exciter 250 prior to splitting the signal 251 (i.e. into sub-signals) at feed 254. The coded waveforms $f_n(t)$ are convolved with the individual portions of split signal 251 at correlators 277 (to produce coded sub-signals). Coded waveforms $f_n(t)$ may be supplied by a coding generator 272. The coded sub-signals may then be summed by a summer 255. The output of the summer 255 is directed through a high power amplifier (HPA) 256 to be transmitted through the antenna element 264.

The target object 222 is illuminated by the portions of signal 251 (or multiple low power signals) transmitted through the antenna element 264, seemingly not correlated to each other, and therefore, target object 222 might not detect that it is being illuminated with microwave radiation. The reflected signals, however, may be received through a low noise amplifier 258, and will be decoded by the receiver 256 located at the same antenna, and the resultant decoded signals will be added together to create a strong signal. Thus, in the receive mode of the radar system 260, radiation from the transmit element 264 is correlated and receiver 256 is able to detect and perform coherent addition of all N coded transmissions for all the waveforms in the return signal.

It will be appreciated that antenna element 264 illuminates target object 222. In typical radar systems, the beam illuminates an object of interest and energy is scattered back to the antenna.

Processing gain is thus achievable by a correlated receiver, however, radiation is detected as low power at any distance by an uncorrelated receiver or a target object. The antenna element, therefore, coherently integrates the transmit/receive patterns and has the effective transmit/receive gain of a larger antenna enabling the system to effectively act as a high gain transmit/receive antenna.

According to one or more embodiments for a radar system, a target object 222 may be illuminated and waveforms returned as described with respect to FIGS. 2a-2b. For a radar system having correlated receivers, the power detected is: $P_D=[K_r NP_e G_e G_R \lambda^2 \sigma/(4\pi)^3 R^4]$, where "$\sigma$" is the cross-section of target object 222 doing the scattering, $K_r$ is a constant depending upon the transmission medium for the radar system, $G_R$ is the antenna element gain when in the receive mode resulting in the effective receive gain of ($NG_R$) and $\lambda$ is the wavelength of the radiation. The transmit power is ($P_e$) and the effective receiver gain is ($NG_e$). $P_D$ in this case is the power detected by a conventional radar, where no coding was used. For this radar system, the power density $P_D$ at distance "R" will be the same as described for the communications system in FIG. 1. If a correlated receiver is present at distance "R" then the power density will be: $P_D=K_c NP_e G_e/4\pi R^2$. If the receiver at distance "R" is uncorrelated, or if the radiation is incident on an object at distance "R", then the power density seen by the uncorrelated receiver or the object will be: $P_D=K_c P_e G_e/4\pi R^2$.

From these equations, it will thus be appreciated that a multicode aperture radar provides equivalent performance while reducing the power density incident at distance "R" by a factor of N.

One or more embodiments utilize the gain that is achievable from the antenna to get a factor of N improvement in a radar or communications system performance.

According to one or more embodiments, power management is achieved as the signal looks like a collection of small uncorrelated signals to uncorrelated receivers or target objects. An external receiver or target object sees a very low output of power from the system, making the system less detectable with very low RFI while delivering the necessary power density.

Although a transmitter/receiver system has been described with respect to a communications system (FIG. 1) as well as radar systems (FIGS. 2a-2c), there are other applications that would benefit from the configuration of this architecture. For example, in the case of an ultrasound system, the antenna may be replaced by an ultrasound transmitter or ultrasound transmitter/receiver, and in the case of an optical or infrared system, the antenna may be replaced by an optical or infrared transmitter or optical or infrared transmitter/receiver.

Figure 3:
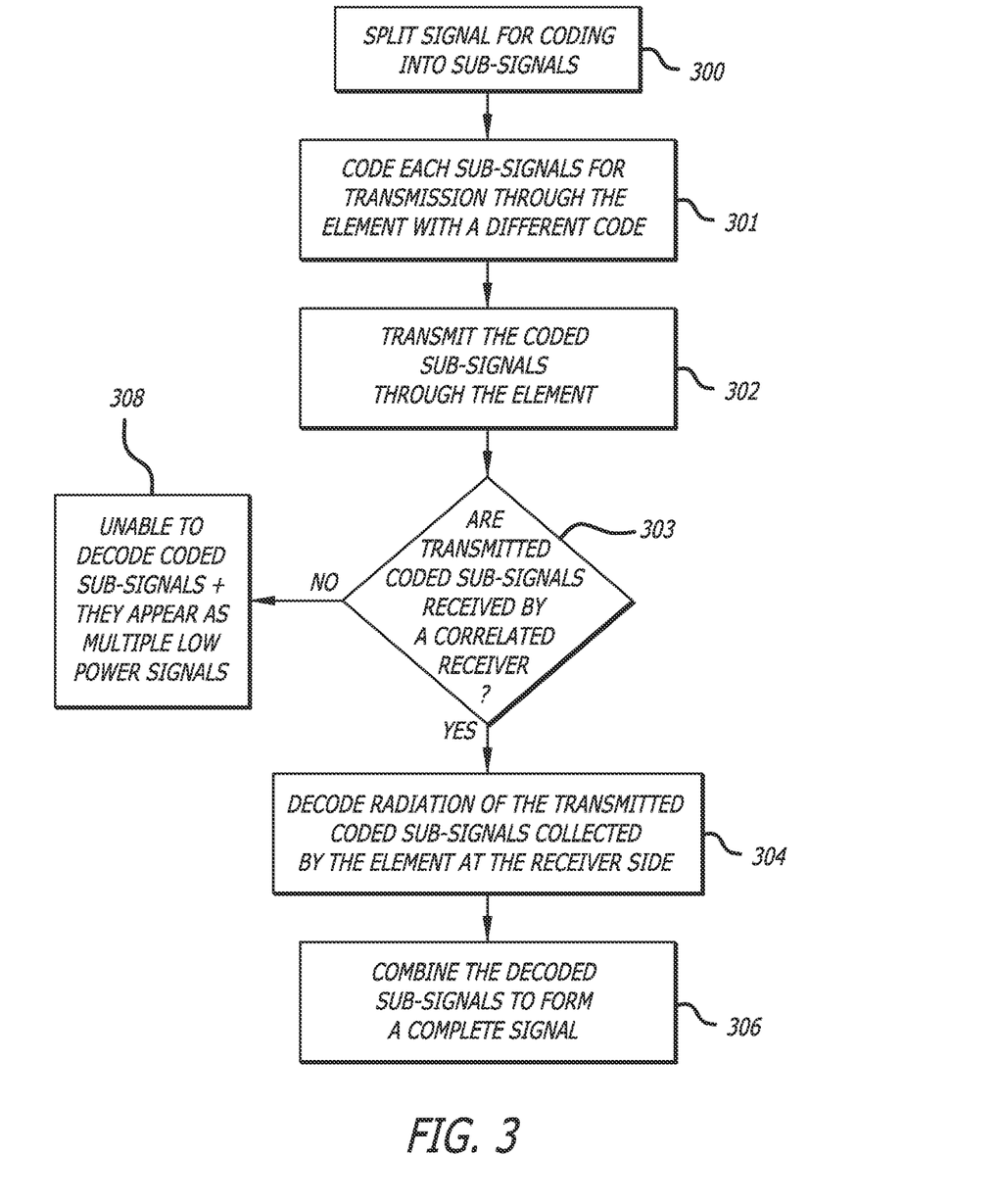
FIG. 3 shows a flow diagram illustrating a method for transmitting/receiving signals, according to an embodiment.

Referring now to FIG. 3, a flow diagram illustrating a method for transmitting/receiving signals according to an embodiment is provided. The method of FIG. 3 may be implemented with the communications system shown in FIG. 1 where the antenna acts as a transmitter with an external cooperative correlated receiver. Also, the method of FIG. 3 may be implemented with the radar systems shown in FIGS. 2a-2c where the antenna as a transmitter and a receiver and illuminates an external target object 222. Furthermore, the method of FIG. 3 may be implemented in other applications such as an ultrasound system where the antenna may be replaced by an ultrasound transmitter aperture or ultrasound transmitter/receiver aperture or an optical or infrared system where the antenna may be replaced by an optical or infrared transmitter aperture or optical or infrared transmitter/receiver aperture.

In block 300, a signal is split into low power signals (i.e. sub-signals) for coding. As described with respect to FIGS. 1 and 2a-2c, the signal is split and each individual portion (low power signal) of the split signal may be coded with waveforms orthogonal to each other and then transmitted through the individual element 114, 214, 264.

In block 301, the portions of the signal (i.e. the sub-signals) are coded with a different code (to produce coded sub-signals).

In block 302, the antenna element transmits the coded portion of the signal (i.e. transmits the coded sub-signals). The coding for each sub-signal is different and orthogonal, that is, an object in space sees the energy from each coded sub-signal as independent.

In block 303, it is determined whether the transmitted coded portions of the signal (i.e. coded sub-signals) are received by a correlated receiver. If not, in block 308, an uncorrelated receiver is unable to decode the transmitted coded portions of the signal (i.e. the coded sub-signals). The radiation from the antenna element 114, 214, 264, for example, does not combine at an external receiver in the case of a communications system, nor at a target object or at a radar receiver in the case of a radar system, to appear as if the energy is coming from a single larger sized antenna. Consequently, the coherent addition in power does not occur at the external receiver or at the target object. The power detected by the uncorrelated receiver individual element 116 (FIG. 1) or seen by the target object 222 (FIGS. 2a-c), for example, is the incoherent addition of radiation from the coded sub-signals, which is very low when the loss from propagation to the target object or receiver is taken into account.

In block 304, if the transmitted coded portions of the signal are received by a correlated receiver, then the antenna element at the receiver side collects the radiation for all the different transmitted coded signals. The collected signal is then fed to the receiver through the feed. In the communications system of FIG. 1, the antenna element 116 on an external receiver side collects all the portions of signal 102 and sends them to the receiver 120 where the transmitted signals are decoded and added to form the received signal. In the radar systems of FIG. 2a-2c, the antenna element on a correlated receiver side collects and amplifies all the return coded signals and sends them through the feed to the receiver where they are decoded and added to form the detected return signal. In an optical or infrared system the antenna element may be replaced by an optical or infrared laser transmitter/receiver aperture such as a laser diode transmitter aperture and a receive heterodyne detector. In an ultrasound system, the antenna element may be replaced by an ultrasound transmitter/receiver aperture.

In block 306, all the multiple decoded signals (i.e. the decoded sub-signals) are combined or added. Thus, the antenna element sees the received signals as if they were a high power, high gain transmitter and a high gain receiver, and operates as a conventional high power antenna system.

According to one or more embodiments, the coded transmitter/receiver system may assist in power management for microwave, optical, ultrasonic or other equipment. In many applications, it is desired to radiate power at levels as low as possible to avoid interference with other equipment and minimize radiation hazards to animate (people or animals, for example, an application would be in avoiding damage to dolphins and whales from Navy sonar testing) or inanimate objects (trigger explosives, damage equipment, etc.). At the same time, radiation of adequate power is necessary so that the equipment functions properly, that is, in the case of a radar system, adequate signal to noise ratio for a given range is desired. In the case of a communications system, adequate power to get acceptable bit error rate is desired.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for transmitting and receiving signals, the method comprising:
   splitting, with a splitter, a signal into more than two low power portions;
   coding, with more than two coders, the more than two low power portions of the signal to produce more than two orthogonal coded low power portions of the signal, wherein the coding comprises convolving each low power portion of the signal with a respective different code;
   summing, with a summer, the more than two orthogonal coded low power portions of the signal to produce a resultant coded signal;
   transmitting, with a single transmitter antenna element, the resultant coded signal towards a target object;
   receiving, with a single receiver antenna element, a reflected resultant coded signal, wherein the resultant coded signal reflects off the target object to produce the reflected resultant coded signal;
   decoding, with more than two decoders, the reflected resultant coded signal to produce a decoded signal; and
   correlating, with a correlator, the decoded signal to produce a complete received signal.

2. The method of claim 1, wherein the complete received signal has a power density N times higher when utilizing the correlator, than when not using the correlator,
   wherein N is equal to the number of low power portions.

3. The method of claim 1, wherein the receiver antenna element is associated with a plurality of receiver elements, wherein each of the receiver elements receives all of the reflected resultant coded signal.

4. The method of claim 1, wherein the transmitter antenna element and the receiver antenna element are one of a same antenna element or different antenna elements.

5. The method of claim 1, wherein the splitter is a feed network.

6. The method of claim 1, wherein the different codes are orthogonal waveforms.

7. The method of claim 6, wherein the orthogonal waveforms are at least one of Gold Code waveforms, code division multiple access (CDMA) waveforms, and frequency division multiple access (FDMA) waveforms.

8. The method of claim 1, wherein the transmitter antenna element is one of a radio frequency (RF) antenna, an ultrasound aperture, an optical aperture, and an infrared aperture.

9. The method of claim 1, wherein the receiver antenna element is one of a radio frequency (RF) antenna, an ultrasound aperture, an optical aperture, and an infrared aperture.

10. The method of claim 1, wherein the transmitter antenna element and the receiver antenna element are in one of a communications system and a radar system.

11. The method of claim 10, wherein the receiver antenna element, in the communications system, is located externally with an external receiver.

12. The method of claim 1, wherein the decoding comprises convolving the reflected resultant coded signal with a complex conjugate of a sum of the different codes.

13. A system for transmitting and receiving signals, the system comprising:
   a splitter to split a signal into more than two low power portions;
   more than two coders to code the more than two low power portions of the signal to produce more than two orthogonal coded low power portions of the signal, wherein the coding comprises convolving each low power portion of the signal with a respective different code;
   a summer to sum the more than two orthogonal coded low power portions of the signal to produce a resultant coded signal;
   a single transmitter antenna element to transmit the resultant coded signal towards a target object;
   a single receiver antenna element to receive a reflected resultant coded signal, wherein the resultant coded signal reflects off the target object to produce the reflected resultant coded signal;
   more than two decoders to decode the reflected resultant coded signal to produce a decoded signal; and
   a correlator to correlate the decoded signal to produce a complete received signal.

14. The system of claim 13, wherein the complete received signal has a power density N times higher when utilizing the correlator, than when not using the correlator,
   wherein N is equal to the number of low power portions.

15. The system of claim 13, wherein the receiver antenna element is associated with a plurality of receiver elements, wherein each of the receiver elements receives all of the reflected resultant coded signal.

16. The system of claim 13, wherein the transmitter antenna element and the receiver antenna element are one of a same antenna element or different antenna elements.

17. The system of claim 13, wherein the splitter is a feed network.

18. The system of claim 13, wherein the different codes are orthogonal waveforms.

19. The system of claim 18, wherein the orthogonal waveforms are at least one of Gold Code waveforms, code division multiple access (CDMA) waveforms, and frequency division multiple access (FDMA) waveforms.

20. An apparatus for transmitting and receiving signals, the apparatus comprising:
  a splitter to split a signal into more than two low power portions;
  more than two coders to code the more than two low power portions of the signal to produce more than two orthogonal coded low power portions of the signal, wherein the coding comprises convolving each low power portion of the signal with a respective different code;
  a summer to sum the more than two orthogonal coded low power portions of the signal to produce a resultant coded signal;
  a single transmitter antenna element to transmit the resultant coded signal towards a target object;
  a single receiver antenna element to receive a reflected resultant coded signal, wherein the resultant coded signal reflects off the target object to produce the reflected resultant coded signal;
  more than two decoders to decode the reflected resultant coded signal to produce a decoded signal; and
  a correlator to correlate the decoded signal to produce a complete received signal.

* * * * *